United States Patent Office 3,732,176
Patented May 8, 1973

3,732,176
LOW RESILIENCY MICROCELLULAR POLYURE-
THANE ELASTOMER WITH INTEGRAL SKIN
AND METHOD FOR PREPARATION THEREOF
Fritz Hostettler, Freehold, N.J., and George W. Huffman, Crystal Lake, Ill., assignors to The Quaker Oats Company, Chicago, Ill.
No Drawing. Filed Jan. 12, 1972, Ser. No. 217,280
Int. Cl. C08g 22/44
U.S. Cl. 260—2.5 AP
5 Claims

ABSTRACT OF THE DISCLOSURE

This invention relates to a method for preparing certain microcellular elastomers having low resiliency and an integral skin which is substantially non-porous comprising contacting certain polyether glycols and ethylene oxide capped 4,4'-isopropylidenediphenol with methylene bis(4-phenylisocyanate) in the presence of a blowing agent and a catalyst system consisting of a tertiary amine and an organotin compound.

BACKGROUND OF THE INVENTION

Field of the invention

This invention concerns a novel process for the preparation of certain novel low resiliency microcellular elastomers with integral skins which are substantially non-porous.

Description of the prior art

One of the most significant contributions to the growth of polyurethane technology in recent years is the development of microcellular polyurethane elastomers with integral skins. Integral skin microcellular elastomers, when molded, form their own tough skin which takes on the exact pattern of the mold. This eliminates the separate process of encapsulating the microcellular elastomer in a skin after its formation. A considerable savings in labor cost is thus realized.

Various methods have been proposed to fabricate microcellular polyurethane elastomers with integral skins. U.S. Pat. No. 3,527,852 discloses one such method. The latter scheme relies on rotating the mold to produce the integral skin. It is apparent that it would be highly desirable to provide a method of manufacturing microcellular polyurethane elastomers with integral skins which does not require the rotation, rocking, agitation, etc., of the mold.

Most microcellular polyurethane elastomers with integral skins have been made with chlorinated aromatic diamines, modified diphenylmethane diisocyanate or quasi-prepolymers of toluene diisocyanate to obtain the necessary skin properties to resist abuse. These systems based on aromatic diamines are highly reactive, yielding very short handling times. They are also expensive and provide a resilient elastomer. Quasi-prepolymer systems require an extra step. Often these elastomers tend to discolor top protective coatings. Consequently, a system which contains no chlorinated aromatic diamine but produces an elastomer with low resiliency and with a tough skin which is substantially non-porous would be desirable. Low resiliency is advantageous from the point of view of shock absorption and would have particular application in the fabrication of automobile bumpers.

SUMMARY OF THE INVENTION

It is an object of this invention to provide an improved and simple method for preparing certain microcellular polyurethane elastomers with low resiliency and with integral skins wherein the mold is not rocked.

Another object of this invention is to provide a method of manufacturing certain microcellular polyurethane elastomers with low resiliency and with integral skins which eliminates the use of chlorinated aromatic diamines.

Still another object of this invention is to provide a process whereby the product elastomer has an integral skin which is substantially non-porous.

Yet another object of this invention is to provide a process whereby large molded articles can be demolded within about 10 minutes.

The objects of this invention are accomplished by a method for preparing low resiliency microcellular polyurethane elastomers which comprises the sequential steps of (a) contacting under substantially anhydrous conditions:
   (1) 10 to 50 percent by weight of the total polyether glycol of a polytetramethylene ether glycol having an average molecular weight between about 500 and about 2000;
   (2) 90 to 50 percent by weight of the total polyether glycol of a polypropylene ether glycol having an average molecular weight between about 500 and about 2000; and
   (3) ethylene oxide capped 4,4'-isopropylidenediphenol simultaneously with methylene bis(4-phenylisocyanate) in the presence of a catalyst system consisting of a tertiary amine and an organotin compound; and in the presence of a blowing agent which vaporizes under the contacting conditions;
(b) pouring the contacted mixture into a mold which is preheated to a temperature between about 30° C. and 55° C.;
(c) permitting the contents of the mold to cure in contact with the mold; and
(d) removing the resulting self-supporting microcellular polyurethane elastomer with integral skin from the mold.

In our process for the preparation of microcellular polyurethane elastomers we have discovered that the use of ethylene oxide capped 4,4'-isopropylidenediphenol in the above polyurethane elastomer system provides a product which has unusually low resiliency and which has an integral skin which is substantially non-porous.

In our process for the preparation of low resiliency microcellular polyurethane elastomers we use a combination of 10 to 50 percent by weight of the total polyether glycol of a polytetramethylene ether glycol having an average molecular weight between about 500 and about 2000 and 90 to 50 percent by weight of the total polyether glycol of a polypropylene ether glycol having a molecular weight between about 500 and about 2000.

The total polyether glycol refers to the combined amount of the polytetramethylene ether glycol and the polypropylene ether glycol. We have found it convenient to prepare a mixture of the polyether glycols which is subsequently contacted with the ethylene oxide capped 4,4' - isopropylidenediphenol and the methylene bis(4-phenylisocyanate). As the average molecular weight of the polytetramethylene ether glycol approaches 1000, we prefer to liquefy the polyeteramethylene ether glycol by warming it slightly before adding it to the polypropylene ether glycol.

It is preferred that the polytetramethylene ether glycol have an average molecular weight between 600 and 1500 and that the average molecular weight of the polypropylene ether glycol between 1000 and 1500. If the polyether polyols have average molecular weights in the preferred range, they will form a compatible mixture when blended in the above mentioned proportions. Compatibility is to be taken to mean that the blend will not separate into separate phases at room temperature. Throughout this application room temperature is to be taken to mean about 26° C.

The term ethylene oxide capped 4,4'-isopropylidenediphenol is to be understood to mean that ethylene oxide has been permitted to react with 4,4'-isopropylidenediphenol in a molar ratio greater than 2 to 1 and preferably has an average molecular weight about 500. The amount of 4,4'-isopropylidene-diphenol used in our process should be about 1.5 to 3.0 moles to 1 mole of the total polyether glycol.

In addition to the ethylene oxide capped 4,4'-isopropylidenediphenol in order to obtain the crosslinking necessary to entrap the blowing agent and to provide a high quality microcellular polyurethane elastomer, it may be necessary to substitute some polyfunctional material as part of the ethylene oxide capped 4,4'-isopropylidenediphenol.

Representative low molecular weight polyfunctional polyols include saturated aliphatic monomeric polyols such as trimethylol propane; glycerol; 1,2,4-butanetriol; 1,2,6 - hexanetriol; and pentaerythritol. Other representative polyfunctional polyols include triethanolamine. The above polyfunctional polyols contain 3 to 4 hydroxyl groups and are preferred in order to obtain the best physical properties in the resultant microcellular elastomer. As is well known in the art, the amount of polyfunctional polyol, when used, may be varied widely depending on the stiffness of the microcellular elastomer desired. Usually the amount of polyfunctional polyol is small in comparison with the amount of ethylene oxide capped 4,4'-isopropylidenediphenol.

The methylene bis(4-phenylisocyanate) may be crude MDI such as "Isonate 390–P" sold by Upjohn Company, Kalamazoo, Mich.; chemically pure MDI; or liquid MDI such as "Isonate 143–L" also sold by Upjohn Company. "Isonate 143–L" is MDI wherein a sufficient number of the isocyanate groups have been converted to carbodiimide to render the MDI fluid. We prefer to use liquid MDI but solid MDI, either crude or pure, may be used if preheated to about 45–50° C. and contacted as a liquid with the polyether polyols and ethylene oxide capped 4,4'-isopropylidenediphenol. The amount methylene bis(4-phenylisocyanate) is approximately the theoretical amount of equivalents of isocyanate necessary to react with the total number of equivalents of hydroxyl in the ethylene oxide capped 4,4'-isopropylidenediphenol and in the total polyether polyol. We have found that between 0.9 and 1.1 of the theoretical amount is satisfactory in most cases.

We have found that a combination of tertiary amine and organotin compounds gives us a desirable rise time and demolding time. The rise time is the time necessary for the foam to reach its maximum size and the demolding time is the time necessary for the microcellular elastomer to become sufficiently cured that it will not slump when demolded and left unsupported. The rise time must be sufficiently slow so that there is sufficient time for the elastomer to wet-out the mold and form a skin without rotating the mold. If the rise time is too fast the resulting microcellular elastomer will have a pocked surface above the original pour line. The demolding time must be about 10 minutes otherwise the process would be uneconomical for large volume production since too many molds would be necessary.

Suitable tertiary amines consist of alkyl tertiary amines such as tripropylamine; acyclic tertiary amines such as N,N-dimethylcyclohexylamine; and heterocyclic tertiary amines such as N-methyl morpholine, N-ethyl morpholine, N-methyl piperidine, and N-ethyl piperidine.

Among the organotin compounds which we have found useful are stannous acylates such as stannous acetate, stannous octoate, stannous laurate, stannous oleate, etc.; dialkyltin salts of carboxylic acids, e.g., dibutyltin diacetate, dibutyltin dilaurate, dibutyltin maleate, dilauryltin diacetate, dioctyltin diacetate, etc.

The tertiary amine catalyst is present in an amount sufficient to provide a slow even rise. We prefer a rise time of about 40 to 70 seconds. For most purposes about 0.05 to 0.3 percent by weight of tertiary amine based on the total weight of the total reactants (isocyanate, ethylene oxide capped 4,4' - isopropylidenediphenol, and polyether glycol mixture) is sufficient to give a satisfactory rise time. The amount of organotin compound sufficient to give a demolding time about 10 minutes is generally about 0.01 to 0.03 percent by weight based on the weight of the total reactants.

The foaming operation is effected by means of a blowing agent which vaporizes under the contacting conditions. Preferred blowing agents are methylenedichloride, trichlorofluoromethane, and 1,2,2 - trichloro - 1,2,2 trifluoroethane.

Increasing the fluorocarbon blowing agent will decrease the microcellular polyurethane elastomer density up to a point. As is known in the art at some point the evaporation of the blowing agent consumes too much exothermic heat, causing insufficient blowing and improper cure. The density of the resulting microcellular polyurethane elastomer should be between about 20 to 50 pounds per cubic foot. To produce a microcellular polyurethane elastomer with a density of 45 pounds per cubic foot for example we have found that 0.2 percent by weight of trichlorofluoromethane is sufficient blowing agent.

Optional additives such as stabilizers, fillers, colorants, processing aids, surfactants, lubricants, plasticizers, etc., can be incorporated into the microcellular polyurethane elastomer prepared by our process if desired.

In practicing our process the polyether polyol, ethylene oxide capped 4,4'-isopropylidenediphenol, catalyst system, and blowing agent are contacted simultaneously with the isocyanate under substantially anhydrous conditions. By substantially anhydrous conditions we mean that no more than 0.1 percent by weight of water based on the weight of the total reactants be present. The contacting is at ambient temperature, usually around 26° C. The reaction mixture is dumped into a mold which is heated to a temperature between 30° C. and 55° C. After curing at ambient temperature for about 10 minutes, the microcellular elastomer is removed from the mold and may be heat aged in some cases to improve its properties.

The contacting may be accomplished by rapid hand mixing or by mixing in a foaming machine. Any or all of the polyols, i.e. the polyether glycols or the ethylene oxide capped 4,4'-isopropylidenediphenol, may be premixed. The catalyst system may also be premixed with any or all of the polyols. We prefer either of the following techniques: Polyether polyols, ethylene oxide capped 4,4'-isopropylidenediphenol, catalyst system, and the blowing agent are mixed and pumped into a mixing head. Isocyanate is also pumped into the mixing head in a separate stream and is thoroughly mixed with the first stream by a stirrer present in the head.

Alternatively, the blowing agent and the organotin compound may be mixed in a part of the polyether polyols and introduced into the mixing head in a third stream.

In either case, from the mixing head the material is deposited into a heated mold which is moved relative to the mixing head in order to provide a layer of reactants on the bottom thereof. Thus, it is apparent that the process of our invention can be used with any of the usual mixing procedures of making microcellular polyurethane elastomers without requiring expensive and undesirable alterations.

The products of the process of the present invention are useful as microcellular elastomers. These products have an integral skin which is virtually pore free. As used herein "pore free" means that the skin has substantially no pores which are visible under six powers of magnification. The presence of a substantial number of pores having a size substantially greater than that set forth above is most undesirable for many applications. For example, automobile bumpers must be substantially impervious to the penetration of water and chemicals, e.g., during winter freeze-thaw conditions if satisfactory useful life is to be enjoyed. Also, the presence of a substantial number of pores greater than those visible under six powers of magnification presents an extremely difficult finishing problem.

Some specific examples of useful articles which can be made by our process are: auxiliary springs, truck dock pads, gaskets, vibration isolators, and automobile bumpers.

DESCRIPTION OF THE PREFERRED EMBODIMENTS

The following examples are shown for the purpose of illustrating and demonstrating the invention. It will be apparent to those skilled in the art that various changes and modifications may be made therein without departing from the spirit and scope of the invention as it is more precisely defined in the subjoined claims.

In the following examples, parts and percentages are by weight unless otherwise indicated. Room temperature is to be taken to mean 26° C.

Example 25 parts of polytetramethylene ether glycol having an average molecular weight of 1000 was heated at about 38° C. until it became a liquid. The liquid polytetramethylene ether glycol was blended with 75 parts of polypropylene ether glycol having an average molecular weight of 1225. To this blend was added 58 parts of ethylene oxide capped 4,4'-isopropylidene diphenol having an average molecular weight of about 500, 0.5 part of N,N-dimethylcyclohexylamine, 0.05 part of dibutyltin dilaurate, and 0.35 part of trichlorofluoromethane.

The polyols, blowing agent, and catalyst system were machine mixed with 65 parts of "Isonate 143–L" and then poured into a mold which had been preheated to 55° C. The microcellular elastomer was found to have a cream time of 30 seconds, a rise time of 70 seconds, a tackfree time of 180 seconds, and a demolding time of 10 minutes. The cream time is the time necessary for the elastomer to begin to form and the tackfree time is the time necessary for the elastomer to be sufficiently cured to not be sticky to the touch. The microcellular elastomer was cured for 16 hours at 70° C. after demolding.

On cure the product was found to have a well formed integral skin of approximately 1 mm. thickness which was uniformly formed around the microcellular elastomer and which had no substantial number of pores which were visible under 6 powers of magnification. The product further was unexpectedly non-resilient when compared to a similar elastomer wherein 1,4-butanediol was substituted for the ethylene oxide capped 4,4'-isopropylidenediphenol. Furthermore, when 1,4-butanediol was used the mold had to be rotated to produce a satisfactory microcellular elastomer having an integral skin.

The microcellular elastomer wherein 1,4-butanediol was substituted for ethylene oxide capped 4,4'-isopropylidenediphenol is not an embodiment of this invention but was prepared for the purpose of comparing with the product of our process.

From the foregoing description we consider it to be clear that the present invention contributes a substantial benefit to the polyurethane art.

We claim:
1. A low resiliency microcellular polyurethane elastomer which is produced by the process which comprises the sequential steps of
    (a) contacting under substantially anhydrous conditions:
        (1) 10 to 50 percent by weight of the total polyether glycol of a polytetramethylene ether glycol having an average molecular weight between about 500 and about 2000;
        (2) 90 to 50 percent by weight of the total polyether glycol of a polypropylene ether glycol having an average molecular weight between about 500 and about 2000; and
        (3) ethylene oxide capped 4,4'-isopropylidenediphenol
    simultaneously with methylene bis(4-phenylisocyanate) in the presence of a catalyst system consisting of a tertiary amine and an organotin compound; and in the presence of a blowing agent which vaporizes under the contacting conditions;
    (b) pouring the contacted mixture into a mold which is preheated to a temperature between about 30° C. and 55° C.;
    (c) permitting the contents of the mold to cure in contact with the mold; and
    (d) removing the resulting self-supporting microcellular elastomer with integral skin from the mold.
2. The elastomer of claim 1 produced wherein the total polyether glycol comprises 20 to 30 percent by weight of polytetramethylene ether glycol and 80 to 70 percent by weight of polypropylene ether glycol.
3. The elastomer of claim 1 produced wherein the catalyst system consists of 0.05 to 0.3 percent by weight of the tertiary amine and 0.01 to 0.03 percent by weight of the organotin compound, based on the weight of the total reactants.
4. The elastomer of claim 1 produced wherein the catalyst system consists of 0.05 to 0.3 percent by weight of the tertiary amine N,N-dimethylcyclohexylamine and 0.01 to 0.03 percent by weight of the organotin compound selected from the group consisting of stannous octoate and dibutyl tin dilaurate.
5. The elastomer of claim 1 produced wherein the ethylene oxide capped 4,4'-isopropylidenediphenol and the total polyether glycol are in the molar ratio about 1.5:1 to 3:1.

References Cited
UNITED STATES PATENTS
3,582,501  6/1971  Hostettler et al. __ 260—2.5 AB DONALD E. CZAJA, Primary Examiner M. J. WELSH, Assistant Examiner U.S. Cl. X.R.
260—2.5 AB, 2.5 AC, 2.5 AZ; 264—48

UNITED STATES PATENT OFFICE
CERTIFICATE OF CORRECTION

Patent No. 3,732,176      Dated May 8, 1973

Inventor(s) Fritz Hostettler and George W. Huffman

It is certified that error appears in the above-identified patent and that said Letters Patent are hereby corrected as shown below:

Column 4, line 18 "1,2,2 trifluoroethane." should read --1,1,2 trifluoroethane.--

Signed and sealed this 1st day of January 1974.

(SEAL)
Attest:

EDWARD M. FLETCHER, JR.
Attesting Officer

RENE D. TEGTMEYER
Acting Commissioner of Patents